United States Patent
Nguyen Van

(10) Patent No.: US 9,731,728 B2
(45) Date of Patent: Aug. 15, 2017

(54) SENSOR ABNORMALITY DETECTION DEVICE

(71) Applicant: TOYOTA JIDOSHA KABUSHIKI KAISHA, Toyota-shi, Aichi (JP)

(72) Inventor: Quy Hung Nguyen Van, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 14/913,713

(22) PCT Filed: Dec. 12, 2014

(86) PCT No.: PCT/JP2014/083627
§ 371 (c)(1),
(2) Date: Feb. 23, 2016

(87) PCT Pub. No.: WO2015/098715
PCT Pub. Date: Jul. 2, 2015

(65) Prior Publication Data
US 2016/0288799 A1    Oct. 6, 2016

(30) Foreign Application Priority Data
Dec. 26, 2013  (JP) .................. 2013-270336

(51) Int. Cl.
*B60W 50/02*  (2012.01)
*B60W 30/09*  (2012.01)
(Continued)

(52) U.S. Cl.
CPC ........ *B60W 50/0205* (2013.01); *B60W 30/09* (2013.01); *B60W 50/029* (2013.01);
(Continued)

(58) Field of Classification Search
CPC ............. B60W 50/0205; B60W 30/09; B60W 2050/0215; G01S 13/931; G01S 13/87; G01S 2013/9375; G01S 2013/9389
See application file for complete search history.

(56) References Cited

U.S. PATENT DOCUMENTS

2005/0012602 A1* 1/2005 Knoop .................. B60Q 9/008
340/435
2005/0062615 A1* 3/2005 Braeuchle .......... B60K 31/0008
340/903

(Continued)

FOREIGN PATENT DOCUMENTS

| JP | 2005-533321 A | 11/2005 |
| JP | 2006-146372 A | 6/2006 |
| JP | 2006-240453 A | 9/2006 |

*Primary Examiner* — Tuan C. To
(74) *Attorney, Agent, or Firm* — Sughrue Mion, PLLC

(57) ABSTRACT

A sensor abnormality detection device includes a first sensor that detects a situation of a first region at a periphery of an own vehicle; a second sensor that detects a situation of a second region, which is a region different from the first region and includes an overlapping region that overlaps a part of the first region; a sensor abnormality determination means that determines abnormality of the first sensor and the second sensor; and a collision detection means that detects collision of the own vehicle to an object; wherein the sensor abnormality determination means determines that at least one of the first sensor and the second sensor has abnormality when the first region and the second region do not overlap in the overlapping region after the collision is detected.

6 Claims, 10 Drawing Sheets

(51) Int. Cl.
  *G01S 13/93*    (2006.01)
  *G01S 13/87*    (2006.01)
  *B60W 50/029*   (2012.01)
  *G01S 7/40*     (2006.01)
  *B60W 30/08*    (2012.01)

(52) U.S. Cl.
  CPC ................ *G01S 7/40* (2013.01); *G01S 13/87* (2013.01); *G01S 13/931* (2013.01); *B60W 2030/082* (2013.01); *B60W 2050/0215* (2013.01); *B60W 2050/0295* (2013.01); *G01S 2013/9353* (2013.01); *G01S 2013/9375* (2013.01); *G01S 2013/9378* (2013.01); *G01S 2013/9385* (2013.01); *G01S 2013/9389* (2013.01)

(56) References Cited

U.S. PATENT DOCUMENTS

| | | | | |
|---|---|---|---|---|
| 2005/0240319 A1* | 10/2005 | Sawada | ................ | G08G 1/167 701/1 |
| 2006/0103927 A1 | 5/2006 | Samukawa et al. | | |
| 2006/0152351 A1 | 7/2006 | Daura Luna et al. | | |
| 2010/0191425 A1* | 7/2010 | Murata | ............... | B60R 21/0132 701/45 |
| 2011/0133917 A1* | 6/2011 | Zeng | ..................... | G06K 9/6293 340/436 |
| 2012/0113406 A1* | 5/2012 | Bockem | ............... | G01C 15/002 356/3 |
| 2012/0219190 A1* | 8/2012 | Kumagai | ............... | G06T 7/0065 382/104 |
| 2012/0235805 A1* | 9/2012 | Nogami | .................. | G06T 7/215 340/441 |
| 2012/0307059 A1* | 12/2012 | Yamakage | ............ | B60W 40/09 348/148 |
| 2013/0128257 A1* | 5/2013 | Stettner | .................... | G01S 17/06 356/4.01 |
| 2013/0238194 A1* | 9/2013 | Ueda | ........................ | B62D 6/00 701/42 |
| 2013/0286205 A1* | 10/2013 | Okada | ...................... | H04N 7/18 348/148 |
| 2014/0152336 A1* | 6/2014 | Sasaki | ............... | H01L 27/14678 324/762.01 |
| 2014/0319349 A1* | 10/2014 | Horie | ........................ | G01J 1/44 250/338.3 |
| 2015/0009031 A1* | 1/2015 | Bedros | ................. | G08B 29/188 340/566 |
| 2015/0131080 A1* | 5/2015 | Retterath | ................ | G01S 17/10 356/5.01 |

\* cited by examiner

SENSOR ABNORMALITY DETECTION DEVICE

CROSS REFERENCE TO RELATED APPLICATIONS

This application is a National Stage of International Application No. PCT/JP2014/083627 filed Dec. 12, 2014, claiming priority based on Japanese Patent Application No. 2013-270336 filed Dec. 26, 2013, the contents of all of which are incorporated herein by reference in their entirety.

TECHNICAL FIELD

The present invention relates to a sensor abnormality detection device.

BACKGROUND ART

Conventionally, a vehicle mounted with a surrounding environment recognition sensor for recognizing the surrounding situation of a vehicle such as a moving object, a stationary obstacle, and the like at the periphery of the vehicle is known. For example, in a vehicle described in patent literature 1, a plurality of surrounding environment recognition sensors is mounted and the detection regions of such plurality of surrounding environment recognition sensors are overlapped to eliminate a blind angle.

Furthermore, a technique of detecting an abnormality of the surrounding environment recognition sensor in the vehicle mounted with the surrounding environment recognition sensor is also known. For example, in the technique described in patent literature 2, an abnormality such as an axial shift, and the like of the surrounding environment recognition sensor is detected at the time of collision detection. Specifically, in the technique described in patent literature 2, when a detection value of an impact sensor is greater than or equal to a predetermined value and a collision duration time is greater than or equal to a predetermined time, and when the detection value of the impact sensor is smaller than the predetermined value and a predetermined time has elapsed from the collision predicted time at the time of the collision detection, detection is made that the abnormality such as the axial shift, and the like of the surrounding environment recognition sensor exists.

CITATION LIST

Patent Literature

Patent literature 1: Japanese National Publication of International Patent Application No. 2005-533321
Patent literature 2: Japanese Patent Application Laid-open No. 2006-240453

DISCLOSURE OF INVENTION

Problems to be Solved by the Invention

In the conventional technique that determines that the surrounding environment recognition sensor has abnormality after the collision satisfying a predetermined condition is detected as in the technique described in patent literature 2, determination is made that the surrounding environment recognition sensor has abnormality based on the magnitude, the duration time, and the timing of the impact. Thus, the conventional technique has a possibility of erroneously detecting the abnormality of the surrounding environment recognition sensor regardless of whether or not the abnormality of the surrounding environment recognition sensor actually occurred.

For example, even if the collision satisfying the predetermined condition is detected, there is a possibility that the abnormality actually has not occurred in the surrounding environment recognition sensor and the sensor continues to operate normally. In this case, the conventional technique of patent literature 2, and the like that determines that the surrounding environment recognition sensor has abnormality when the collision satisfying the predetermined condition is detected, has a possibility of erroneously detecting that the surrounding environment recognition sensor has abnormality when the collision satisfying the predetermined condition is detected, although the surrounding environment recognition sensor is continuously operating normally.

Thus, the conventional technique still can be improved in the accuracy in the detection of the abnormality of the surrounding environment recognition sensor at the time of collision.

In light of the foregoing, it is an object of the present invention to provide a sensor abnormality detection device that can detect, at high accuracy, the abnormality of the surrounding environment recognition sensor that may occur at the time of collision detection, in the vehicle mounted with a plurality of surrounding environment recognition sensors.

Solutions to the Problems

A sensor abnormality detection device according to the present invention includes a first sensor configured to detect a situation of a first region at a periphery of an own vehicle; a second sensor configured to detect a situation of a second region at the periphery of the own vehicle, the second region being a region different from the first region and including an overlapping region that overlaps a part of the first region; a sensor abnormality determination means configured to determine presence or absence of abnormality of the first sensor and the second sensor; and a collision detection means configured to detect collision of the own vehicle to an object exterior to the vehicle. The sensor abnormality determination means determines that at least one of the first sensor and the second sensor has abnormality, at the time the first region and the second region do not overlap in the overlapping region, after the collision detection means detects the collision.

In the sensor abnormality detection device, it is preferable that the sensor abnormality determination means determines at least one of the first sensor and the second sensor has abnormality, at the time the first sensor and the second sensor do not detect the same situation in the overlapping region, after the collision detection means detects the collision.

In the sensor abnormality detection device, it is preferable that the sensor abnormality detection device further includes a position estimating means configured to estimate a position of an obstacle at the periphery of the own vehicle based on detection results of the first sensor and the second sensor; and an avoidance control means configured to avoid movement of the own vehicle to a position of the obstacle. At the time determined by the sensor abnormality determination means that the sensor has abnormality after the collision detection means detects the collision, the avoidance control means limits the movement of the own vehicle to a direction where the sensor determined to be abnormal is arranged in the own vehicle compared to at the time determined that the sensor is normal.

A sensor abnormality detection device includes a first sensor configured to detect a situation of a first region at a periphery of an own vehicle; a second sensor configured to detect a situation of a second region at the periphery of the own vehicle, the second region being a region different from the first region and including a first overlapping region that overlaps a part of the first region; a third sensor configured to detect a situation of a third region at the periphery of the own vehicle, the third region being a region different from the first region and the second region and including a second overlapping region that overlaps a part of the first region; a sensor abnormality determination means configured to determine presence or absence of abnormality of the first sensor, the second sensor, and the third sensor; and a collision detection means configured to detect collision of the own vehicle to an object exterior to the vehicle. At the time determining that at least one of the first sensor and the second sensor has abnormality at the time the first sensor and the second sensor do not detect the same situation in the first overlapping region after the collision detection means detects the collision, the sensor abnormality determination means further determines whether or not the first sensor and the third sensor detect the same situation in the second overlapping region, and at the time the first sensor and the third sensor detect the same situation in the second overlapping region, the sensor abnormality determination means determines that the first sensor does not have abnormality and the second sensor has abnormality.

Effects of the Invention

The sensor abnormality detection device according to the present invention has an effect of being able to detect, at high accuracy, the abnormality of the surrounding environment recognition sensor that may occur at the time of collision detection in the vehicle mounted with the plurality of surrounding environment recognition sensors.

DESCRIPTION OF EMBODIMENTS

An embodiment of a sensor abnormality detection device according to the present invention will be hereinafter described in detail based on the drawings. The present invention is not limited by such embodiment. The configuring elements in the following embodiment include elements that can be easily contrived by those skilled in the art and elements that are substantially the same.

Embodiment

Figure 1:
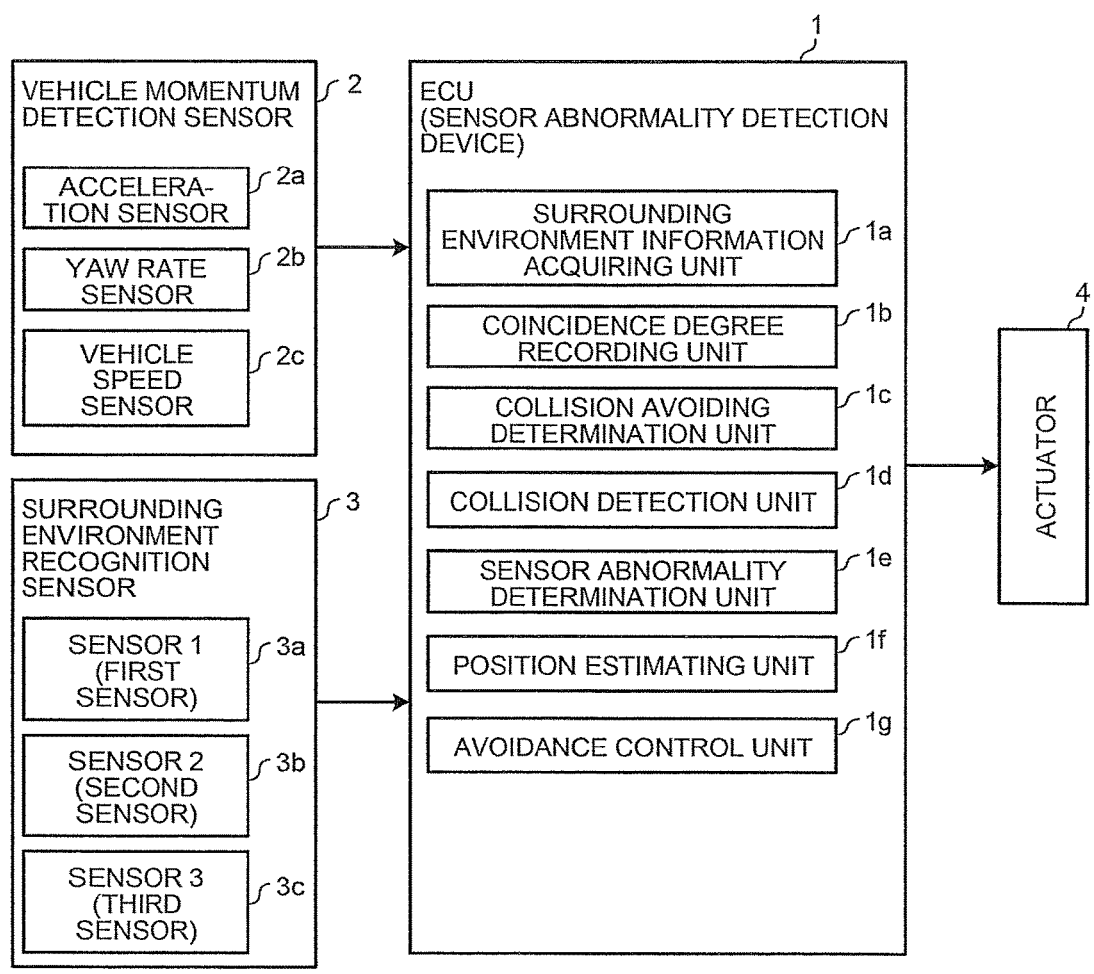
FIG. 1 is a view illustrating a configuration of a sensor abnormality detection device according to the present invention.
Figure 2:
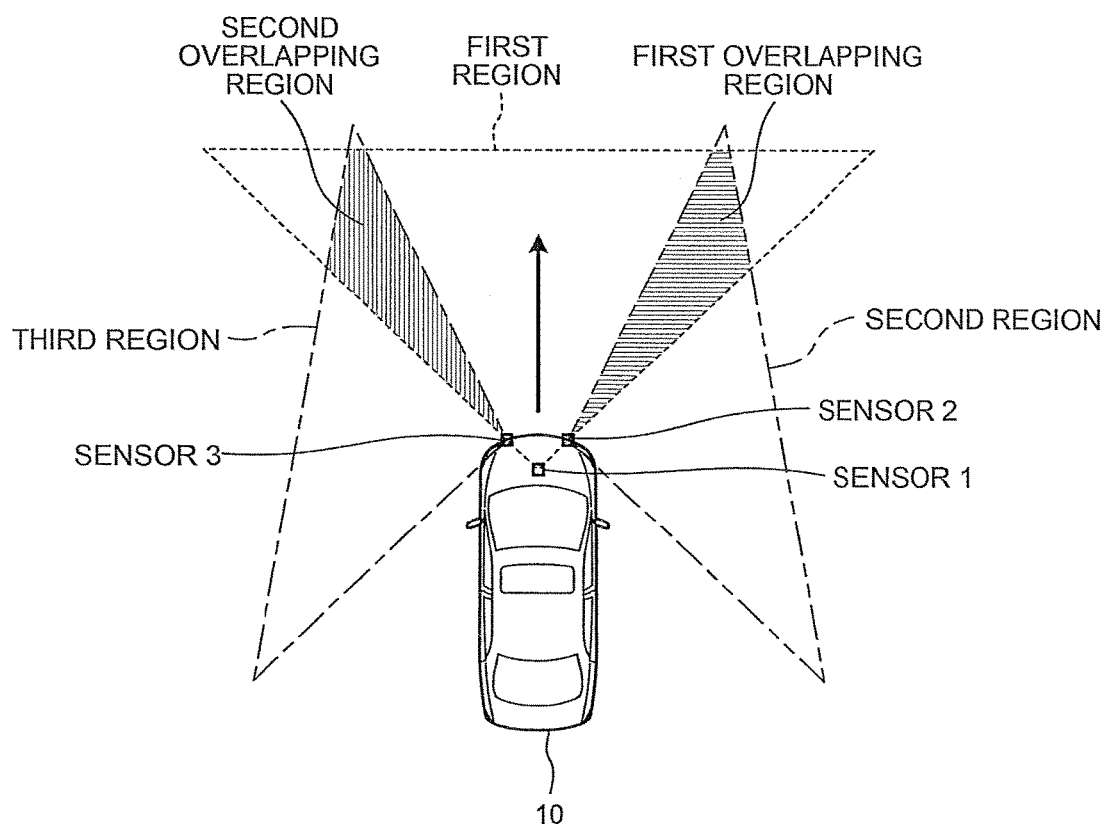
FIG. 2 is a view illustrating one example of a detection region of the plurality of surrounding environment recognition sensors mounted on a vehicle.
Figure 3:
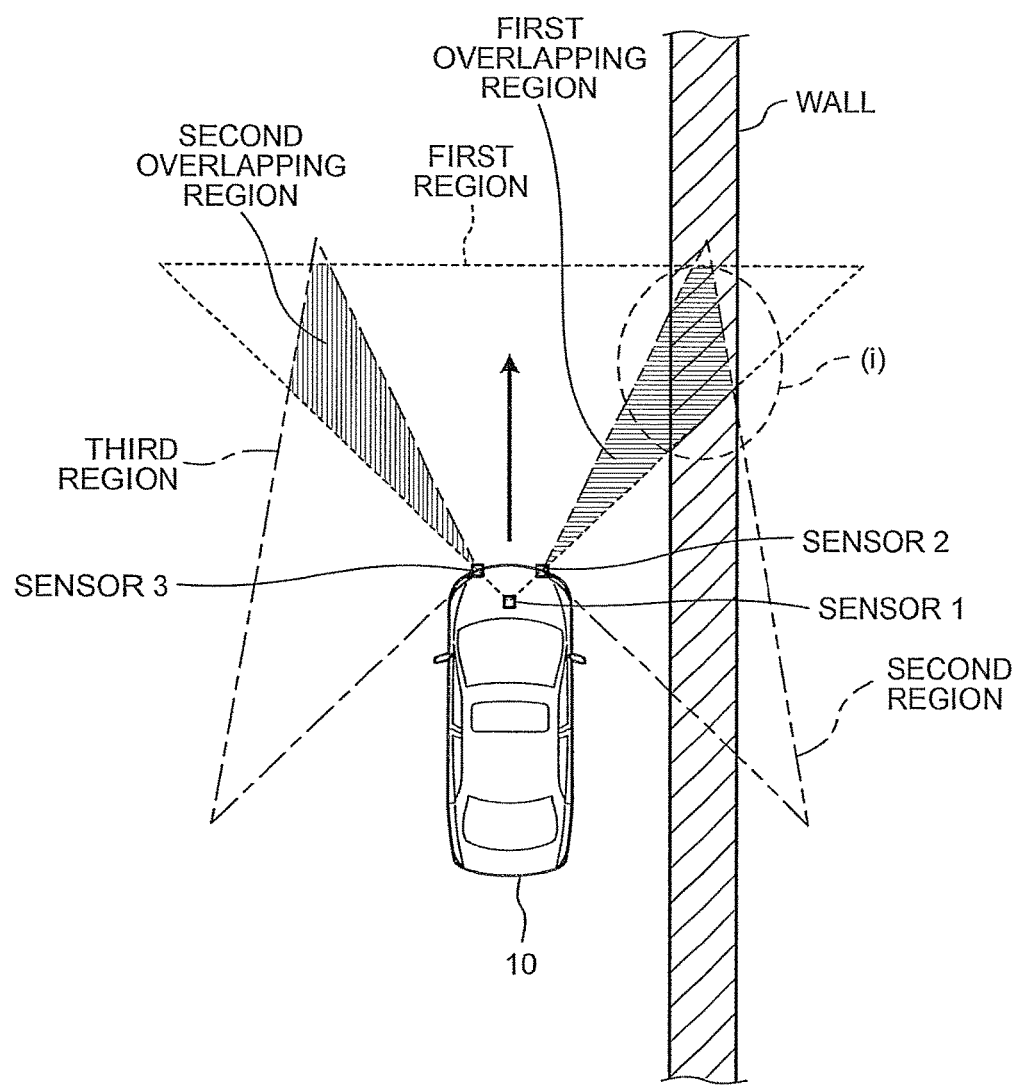
FIG. 3 is a view illustrating one example of a situation of checking a coincidence degree of surrounding environment information in an overlapping region between the sensors.
Figure 4:
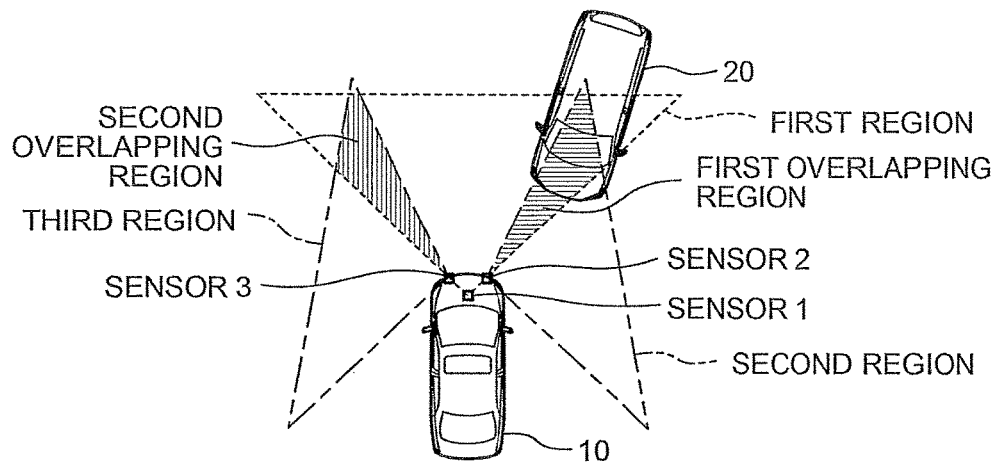
FIG. 4 is a view illustrating one example of a situation of checking a coincidence degree of the surrounding environment information in an overlapping region between the sensors immediately before the collision.
Figure 5:
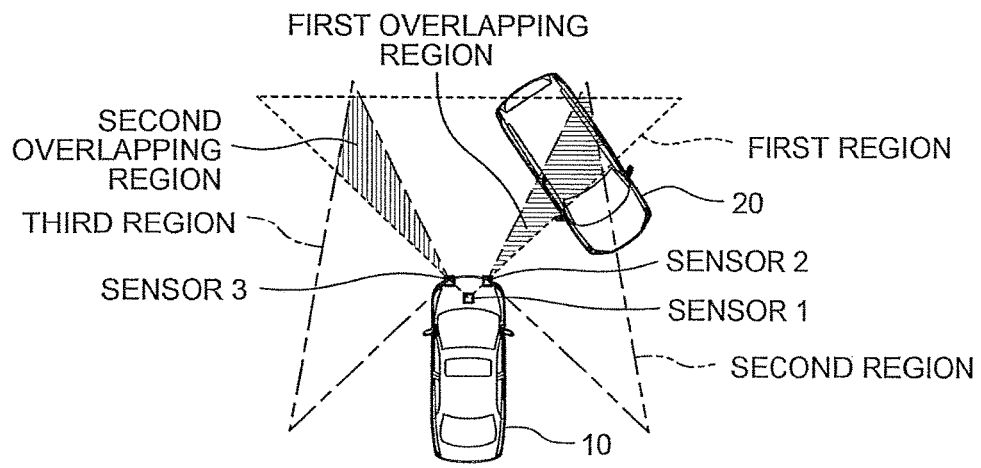
FIG. 5 is a view illustrating one example of a situation of determining as normal in a sensor abnormality determination carried out immediately after the collision.
Figure 6:
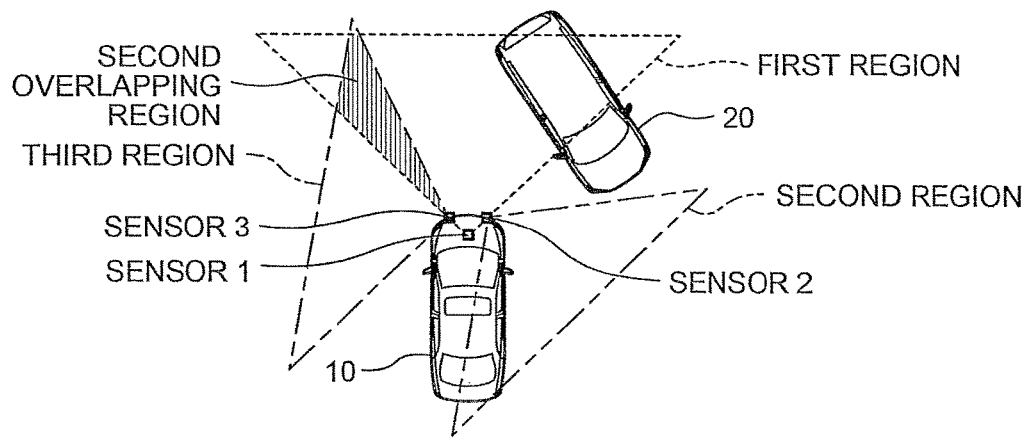
FIG. 6 is a view illustrating one example of a situation of determining as abnormal in the sensor abnormality determination carried out immediately after the collision.
Figure 7:
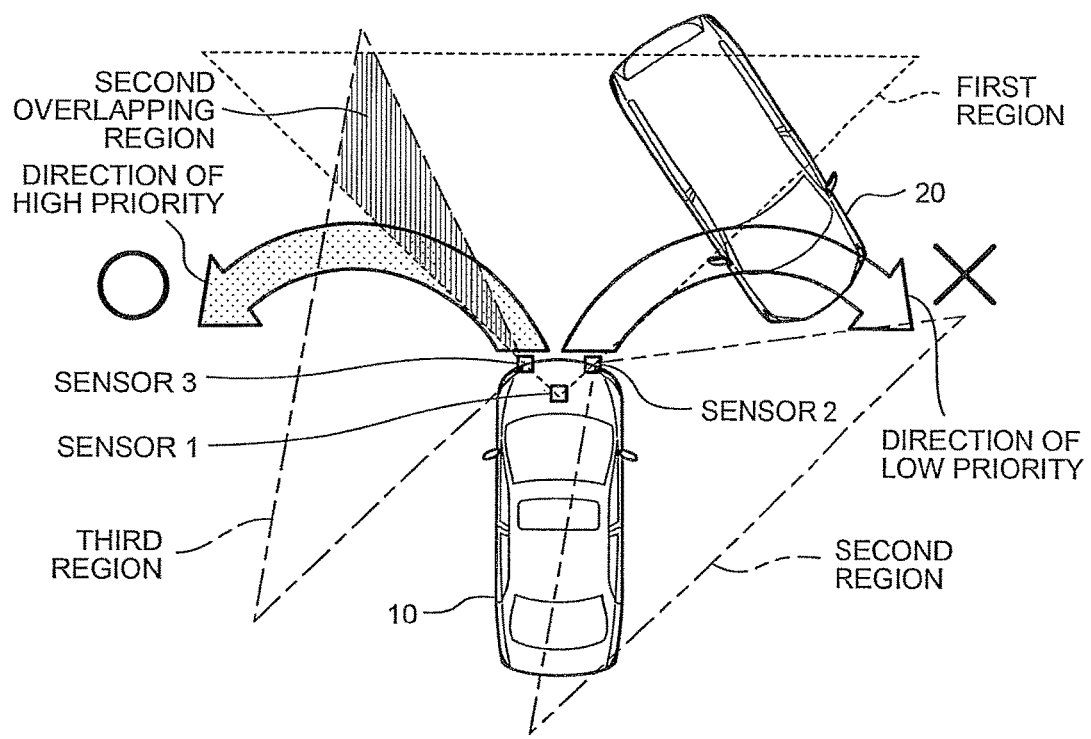
FIG. 7 is a view illustrating one example of an avoidance control carried out based on the sensor abnormality determination result.

A configuration of a sensor abnormality detection device according to the present invention will now be described with reference to FIG. 1 to FIG. 7. FIG. 1 is a view illustrating a configuration of the sensor abnormality detection device according to the present invention. FIG. 2 is a view, illustrating one example of a detection region of a plurality of surrounding environment recognition sensors mounted on a vehicle. FIG. 3 is a view illustrating one example of a situation of checking the coincidence degree of surrounding environment information in an overlapping region between the sensors. FIG. 4 is a view illustrating one example of a situation of checking the coincidence degree of the surrounding environment information in the overlapping region between the sensors immediately before the collision. FIG. 5 is a view illustrating one example of a situation of determining as normal in the sensor abnormality determination carried out immediately after the collision. FIG. 6 is a view illustrating one example of a situation determined as abnormal in the sensor abnormality determination carried out immediately after the collision. FIG. 7 is a view illustrating one example of an avoidance control carried out based on the sensor abnormality determination result.

In the present embodiment, an ECU 1 has a function of a sensor abnormality detection device that detects the abnormality of a surrounding environment recognition sensor 3 mounted on a vehicle. In the present embodiment, the ECU 1 also has a function of a vehicle control device that carries out a drive assistance control of controlling the behavior of the vehicle. The ECU 1 is electrically connected to a vehicle momentum detection sensor 2, the surrounding environment recognition sensor 3, and an actuator 4. The ECU 1 carries out a computation process based on various types of signals input from the vehicle momentum detection sensor 2 and the surrounding environment recognition sensor 3. For example, the ECU 1 carries out the computation process of determining the presence or absence of collision based on various types of signals, determining the presence or absence of abnormality of the surrounding environment recognition sensor 3 that may occur accompanying the collision, and the like. The ECU 1 carries out the drive assistance control of outputting a control signal based on the computation process result to the actuator 4, and operating the actuator 4 to control the behavior of the vehicle.

The vehicle momentum detection sensor 2 is a vehicle momentum detection device that detects various types of information indicating a vehicle momentum. In the present embodiment, the vehicle momentum detection sensor 2 includes an acceleration sensor 2a, a yaw rate sensor 2b, and a vehicle speed sensor 2c.

The acceleration sensor 2a is an acceleration detection device that detects an acceleration exerted on the vehicle body. The acceleration sensor 2a outputs an acceleration signal indicating the detected acceleration to the ECU 1.

The yaw rate sensor 2b is a yaw rate detection device that detects the yaw rate of the vehicle. The yaw rate sensor 2b outputs a yaw rate signal indicating the detected yaw rate to the ECU 1.

The vehicle speed sensor 2c is a wheel speed detection device that is arranged for every wheel to detect the respective wheel speed. Each vehicle speed sensor 2c detects the wheel speed, which is the rotation speed of each wheel. Each vehicle speed sensor 2c outputs a wheel speed signal indicating the detected wheel speed of each wheel to the ECU 1. The ECU 1 calculates the vehicle speed, which is the travelling speed of the vehicle, based on the wheel speed of each wheel input from each vehicle speed sensor 2c. The ECU 1 may calculate the vehicle speed based on the wheel speed input from at least one of the vehicle speed sensors 2c.

Thus, the vehicle momentum detection sensor 2 detects the acceleration detected by the acceleration sensor 2a, the yaw rate detected by the yaw rate sensor 2b, and the wheel speed detected by the vehicle speed sensor 2c as information indicating the vehicle momentum, and outputs such information to the ECU 1.

The surrounding environment recognition sensor 3 is a surrounding environment recognition device that recognizes the surrounding situation of the vehicle such as a moving object, a stationary obstacle, and the like at the periphery of the vehicle. The surrounding environment recognition sensor 3 is configured by a radar, a camera, and the like. The surrounding environment recognition sensor 3 acquires information such as a relative position with a white line on a road, a relative position of a surrounding obstacle, a relative position, relative speed, and relative acceleration with a surrounding moving target, and the like, for example, as the surrounding environment information and outputs the surrounding environment information to the ECU 1. Furthermore, the surrounding environment recognition sensor 3 may also acquire, as the surrounding environment information, information associated with the attribute of the surrounding obstacle such as strength, brightness, color, and the like of the recognizing target other than the information such as the relative position, relative speed, and the like of the recognizing target at the periphery of the vehicle, and output such surrounding environment information to the ECU 1. For example, when the surrounding environment recognition sensor 3 is configured by a radar, the wavelength pattern of the reflected wave of the radar differs between when the strength of the object to be recognized by the surrounding environment recognition sensor 3 is hard and soft. The surrounding environment recognition sensor 3 uses such difference in the wavelength pattern to detect the strength of the recognizing target. The brightness and the color of the recognizing target are detected by the difference in the wavelength pattern of the reflected wave of the radar when the surrounding environment recognition sensor 3 is configured by the radar, and are detected by the difference in contrast of an image when the surrounding environment recognition sensor 3 is configured by a camera.

In the present embodiment, the plurality of surrounding environment recognition sensors 3 is mounted on the vehicle. For example, as illustrated in FIG. 1, the surrounding environment recognition sensor 3 is configured by a sensor 1 serving as a first sensor, a sensor 2 serving as a second sensor, and a sensor 3 serving as a third sensor. The number of surrounding environment recognition sensors mounted on the vehicle is not limited to three as illustrated in the example of FIG. 1, and three or more sensors may be mounted on the vehicle.

The sensors 1 to 3 respectively detect the situation of different detection regions. For example, the sensor 1 serves as a first sensor that detects the situation of a first region at the periphery of the own vehicle. The sensor 2 serves as a second sensor that detects the situation of a second region at the periphery of the own vehicle, the second region being a region different from the first region and overlapping a part of the first region. The sensor 3 serves as a third sensor that detects the situation of a third region at the periphery of the own vehicle, the third region being a region different from the first region and the second region and overlapping a part of the first region.

By way of example, a case in which the sensors 1 to 3 are attached to a front surface of a vehicle 10 will be described, as illustrated in FIG. 2. In FIG. 2, the sensor 1 detects the situation of a detection region (first region in FIG. 2) covering the advancing direction side of the vehicle 10. The sensor 2 detects the situation of a detection region (second region in FIG. 2) covering from the front right side toward the right side surface of the vehicle. The sensor 3 detects the situation of a detection region (third region in FIG. 2) covering from the front left side toward the left side surface of the vehicle. The first region detected by the sensor 1 and the second region detected by the sensor 2 are partially overlapped. A bridging region of the sensor 1 and the sensor 2 is referred to as a first overlapping region. The first region detected by the sensor 1 and the third region detected by the sensor 3 are also partially overlapped. A bridging region of the detection regions of the sensor 1 and the sensor 3 is referred to as a second overlapping region. The attachment positions of the sensors are not limited to the front surface as illustrated in the example of FIG. 2, and may be the right side surface, the left side surface, the back surface, and the like, other than the front surface of the vehicle.

Returning back to FIG. 1, the description on the configuration of the sensor abnormality detection device according to the present invention will be described. The ECU 1 includes at least a surrounding environment information acquiring unit 1a, a coincidence degree recording unit 1b, a collision avoiding determination unit 1c, a collision detection unit 1d, a sensor abnormality determination unit 1e, a position estimating unit 1f, and an avoidance control unit 1g.

The surrounding environment information acquiring unit 1a is a surrounding environment information acquiring means that receives and acquires the surrounding environment information indicating the surrounding situation of the vehicle such as the moving body, the stationary obstacle, and the like at the periphery of the vehicle transmitted from the surrounding environment recognition sensor 3. In the present embodiment, the surrounding environment information acquiring unit 1a receives and acquires the surrounding environment information indicating the situations of the first region, the second region, and the third region transmitted from each of the sensor 3a, the sensor 3b, and the sensor 3c mounted as the surrounding environment recognition sensor 3. The surrounding environment information acquiring unit 1a outputs the acquired surrounding environment information to the coincidence degree recording unit 1b, the collision avoiding determination unit 1c, the collision detection unit 1d, the sensor abnormality determination unit 1e, the position estimating unit 1f, the avoidance control unit 1g, and the like.

The coincidence degree recording unit 1b is a coincidence degree recording means that calculates and records the coincidence degree of the surrounding environment information in the overlapping region of the surrounding environment recognition sensor 3 based on the surrounding environment information acquired by the surrounding environment information acquiring unit 1a.

By way of example, as illustrated in FIG. 3, the coincidence degree recording unit 1b calculates and records the coincidence degree of the surrounding environment information in the bridging region between the sensors. In FIG. 3, the coincidence degree recording unit 1b calculates and records the coincidence degree for the surrounding environment information associated with a wall on the right side (position of (i) of FIG. 3) of the vehicle 10 to be recognized in the overlapping region (first overlapping region in FIG. 3) of the sensor 1 and the sensor 2.

In such a case, for example, the coincidence degree recording unit 1b receives, as the surrounding environment information of the sensor 1, the information including the relative position with the wall to become the recognizing target detected in the first overlapping region of the first region, the strength indicating hardness and softness of the wall itself, the brightness of the wall, the color of the wall, and the like from the surrounding environment information acquiring unit 1a. The coincidence degree recording unit 1b also receives, as the surrounding environment information of the sensor 2, the information including the relative position with the wall to become the recognizing target detected in the first overlapping region of the second region, the strength, the brightness, the color of the wall, and the like from the surrounding environment information acquiring unit 1a. The coincidence degree recording unit 1b compares the surrounding environment information of the sensor 1 and the surrounding environment information of the sensor 2 for every parameter (relative position with the wall, strength, brightness, and color in FIG. 3). Then, the coincidence degree recording unit 1b determines that the coincidence degree is high when the parameter to be compared is the same between the sensor 1 and the sensor 2, or is different between the sensor 1 and the sensor 2 but the difference is within a predetermined threshold range. For example, when comparing the relative position with the wall detected by the sensor 1 and the relative position with the wall detected by the sensor 2, the coincidence degree recording unit 1b sets either one of the mounting positions of the sensor 1 and the sensor 2, or a predetermined position on the vehicle as a reference position. The coincidence degree recording unit 1b computes the relative position of the reference position and the wall, and compares the computed relative position to determine the coincidence degree. With regards to the information (e.g., strength, brightness, color, etc. of the wall) associated with the attribute of the wall, the situations respectively detected by the sensor 1 and the sensor 2 are compared to determine the coincidence degree.

When the parameter to be compared (e.g., relative position with the wall detected by the sensor 1, and the relative position with the wall detected by the sensor 2) differs between the sensor 1 and the sensor 2, and such difference is outside the predetermined threshold range, the coincidence degree recording unit 1b determines that the coincidence degree is low. In addition, the coincidence degree recording unit 1b also determines that the coincidence degree of the surrounding environment information is low when the overlapping region of the sensor 1 and the sensor 2 does not exist. The coincidence degree recording unit 1b carries out the process of determining high and low of the coincidence degree of the surrounding environment information between the sensor 1 and the sensor 2 for every parameter to be compared (e.g., every strength, brightness, color of the wall), and calculates the coincidence degree of the surrounding environment information based on high and low of the coincidence degree determined for every parameter. The coincidence degree of the surrounding environment information is, for example, obtained by grading the high and low of the coincidence degree determined for every parameter, and summing up such grades.

In the example of FIG. 3, only the calculation of the coincidence degree of the surrounding environment information related to the wall detected in the first overlapping region, which is the bridging region of the sensor 1 and the sensor 2, has been described for the sake of convenience of the explanation, but in the present embodiment, the coincidence degree recording unit 1b carries out the calculation of the coincidence degree of the surrounding environment information for every pair of the sensors having the overlapping region. For example, the coincidence degree recording unit 1b calculates the surrounding environment information related to the recognizing target detected in the second overlapping region of the first region of the sensor 1 and the surrounding environment information related to the recognizing target detected in the second overlapping region of the third region of the sensor 3 for every parameter to calculate the coincidence degree of the surrounding environment information, in addition to the calculation of the coincidence degree of the surrounding environment information related to the wall detected in the first overlapping region. The coincidence degree recording unit 1b then transmits and records the calculated coincidence degree in a memory of the ECU 1 in correspondence with the calculated time.

In the present embodiment, the coincidence degree recording unit 1b calculates and records the coincidence degree of the surrounding environment information at a predetermined timing. For example, the coincidence degree recording unit 1b calculates and records the coincidence degree of the surrounding environment information in the overlapping region of the surrounding environment recognition sensor 3 at a timing immediately before the collision (i.e., timing at which determination is made that collision is unavoidable by the collision avoiding determination unit 1c) or a timing immediately after the collision (i.e., timing at which the collision is detected by the collision detection unit 1d).

Returning back to FIG. 1, the description on the configuration of the sensor abnormality detection device according to the present invention will be continued. In the ECU 1, the collision avoiding determination unit 1c is a collision avoiding determination means that determines whether or not the collision of the vehicle 10 and the object exterior to the vehicle is avoidable based on the information indicating the vehicle momentum transmitted from the vehicle momentum detection sensor 2 and the surrounding environment information transmitted from the surrounding environment information acquiring unit 1a. The collision avoiding determination unit 1c calculates the time (so-called time-tocollision: TTC) until the collision of the object exterior to the vehicle and the vehicle 10, based on the relative position and the relative speed of the object exterior to the vehicle and the vehicle 10 indicated by the surrounding environment information, and the vehicle speed and the acceleration of the vehicle 10 contained in the information indicated by the vehicle momentum, and the like, for example. The collision avoiding determination unit 1c determines that the collision is avoidable when the calculated TTC is greater than or equal to a predetermined threshold value, and determines that the collision is unavoidable when the calculated TTC is smaller than the predetermined threshold value.

The collision detection unit 1d is a collision detection means that detects that the vehicle 10 collided with the object exterior to the vehicle, based on the information indicating the vehicle momentum transmitted from the vehicle momentum detection sensor 2 and the surrounding environment information transmitted from the surrounding environment information acquiring unit 1a. The collision detection unit 1d detects the collision of the colliding target and the vehicle 10 based on, for example, the change in the relative position of the colliding target and the vehicle 10 indicated by the surrounding environment information, the acceleration and the yaw rate of the vehicle 10 contained in the information indicated by the vehicle momentum, and the like.

The sensor abnormality determination unit 1e is a sensor abnormality determination means that determines the presence or absence of abnormality of the first sensor that detects the situation of the first region at the periphery of the vehicle 10, and the second sensor that detects the situation of the second region at the periphery of the vehicle 10, the second region being a region different from the first region and overlapping a part of the first region. The sensor abnormality determination unit 1e determines that the first sensor and the second sensor are normal under a situation where the overlapping region, in which the first region and the second region are partially overlapped, exists after the collision detection unit 1d detects the collision, and determines that at least one of the first sensor and the second sensor has abnormality under a situation where the first region and the second region do not overlap in the overlapping region. Specifically, the sensor abnormality determination unit 1e determines that at least one of the first sensor and the second sensor has abnormality when the first sensor and the second sensor do not detect the same situation in the overlapping region, after the collision detection unit 1d detects the collision.

By way of example, a process in which the sensor abnormality determination unit 1e determines the presence or absence of abnormality of the sensor assuming the first sensor is the sensor 1, the second sensor is the sensor 2, and the overlapping region in which the first region and the second region are partially overlapped is the first overlapping region will be described with reference to FIG. 4 to FIG. 6.

FIG. 4 illustrates a situation where the vehicle 10 serving as an own vehicle cannot avoid collision with another vehicle 20 serving as a moving object at the periphery of the vehicle. In the situation illustrated in FIG. 4, the collision avoiding determination unit 1c of the ECU 1 first calculates the time (TTC) until the collision of the vehicle 20 and the vehicle 10 based on the relative position and the relative speed of the vehicle 20 and the vehicle 10 indicated by the surrounding environment information, and the vehicle speed and the acceleration of the vehicle 10 contained in the information indicated by the vehicle momentum, and the like. The collision avoiding determination unit 1c then determines that the collision is unavoidable since the calculated TTC is smaller than the predetermined threshold value. Subsequently, the coincidence degree recording unit 1b of the ECU 1 calculates and records the coincidence degree of the surrounding environment information in the overlapping region of the surrounding environment recognition sensor 3 when determined that the collision is unavoidable by the collision avoiding determination unit 1c (i.e., timing immediately before the collision). Specifically, in the example of FIG. 4, the coincidence degree recording unit 1b receives, as the surrounding environment information of the sensor 1, information including the relative position with the vehicle 20 detected in the first overlapping region of the first region, the strength, the brightness, and the color of the vehicle 20, and the like from the surrounding environment information acquiring unit 1a. The coincidence degree recording unit 1b also receives, as the surrounding environment information of the sensor 2, information including the relative position with the vehicle 20 detected in the first overlapping region of the second region, the strength, the brightness, and the color of the vehicle 20, and the like from the surrounding environment information acquiring unit 1a. The coincidence degree recording unit 1b compares the surrounding environment information of the sensor 1 and the surrounding environment information of the sensor 2 for each parameter (relative position with the vehicle 20, strength, brightness, and color in FIG. 4) to calculate the coincidence degree, and transmits and records the calculated coincidence degree in the memory of the ECU 1 in correspondence with the calculated time. In the example of FIG. 4, the relative position with the vehicle 20 as well as the strength, the brightness, and the color of the vehicle 20 detected in the first overlapping region by the sensor 1 and the relative position with the vehicle 20 as well as the strength, the brightness, and the color of the vehicle 20 detected in the first overlapping region by the sensor 2 are the same extent, and hence the coincidence degree recording unit 1b records the coincidence degree assuming the coincidence degree of the surrounding environment information associated with the vehicle 20 detected in the first overlapping region, which is the bridging region of the sensor 1 and the sensor 2, is high.

FIG. 5 illustrates a situation immediately after the vehicle 10 serving as the own vehicle collided with another vehicle 20 serving as the moving object at the periphery of the vehicle, and the sensor is normally operating even by collision. In the situation illustrated in FIG. 5, the collision detection unit 1d of the ECU 1 first detects the collision of the vehicle 20 and the vehicle 10 based on the change in the relative position of the vehicle 20 and the vehicle 10 indicated by the surrounding environment information, the acceleration and the yaw rate of the vehicle 10 contained in the information indicated by the vehicle momentum, and the like. The coincidence degree recording unit 1b of the ECU 1 calculates and records the coincidence degree of the surrounding environment information in the overlapping region of the surrounding environment recognition sensor 3 when the collision is detected by the collision detection unit 1d (i.e., timing immediately after the collision). Specifically, in the example of FIG. 5, the coincidence degree recording unit 1b calculates and records the coincidence degree of the surrounding environment information related to the vehicle 20 acquired in the first overlapping region of the first region of the sensor 1 and the surrounding environment information related to the vehicle 20 acquired in the second overlapping region of the second region of the sensor 2. In the example of FIG. 5, the relative position with the vehicle 20, as well as the strength, the brightness, and the color of the vehicle 20 detected in the first overlapping region by the sensor 1 and the relative position with the vehicle 20, as well as the strength, the brightness, and the color of the vehicle 20 detected in the first overlapping region by the sensor 2 are the same extent, and hence the coincidence degree recording unit 1b records the coincidence degree assuming the coincidence degree of the surrounding environment information associated with the vehicle 20 detected in the first overlapping region, which is the bridging region of the sensor 1 and the sensor 2, is high.

Thereafter, the sensor abnormality determination unit 1e of the ECU 1 loads the coincidence degree of the surrounding environment information recorded by the coincidence degree recording unit 1b at the timing immediately before the collision as illustrated in the example of FIG. 4 from the memory of the ECU 1. The sensor abnormality determination unit 1e compares the loaded coincidence degree of the surrounding environment information related to the vehicle 20 at the timing immediately before the collision, and the coincidence degree of the surrounding environment information recorded by the coincidence degree recording unit 1b at the timing immediately after the collision as illustrated in the example of FIG. 5. As a result of the comparison, the sensor abnormality determination unit 1e determines that the abnormality did not occur in the sensor 1 and the sensor 2 before and after the collision when the coincidence degree of the surrounding environment information at the timing immediately before the collision is high as illustrated in the example of FIG. 4, and the coincidence degree of the surrounding environment information at the timing immediately after the collision is also high as illustrated in the example of FIG. 5 since both coincidence degrees are the same extent. This is assumed to be because the abnormality such as axial shift, and the like does not occur in either the sensor 1 or the sensor 2 by the collision, and change does not arise by the collision in the first region covered by the sensor 1 and also in the second region covered by the sensor 2. Thus, the sensor abnormality determination unit 1e determines that the first sensor and the second sensor are normal under the situation where the overlapping region, in which the first region and the second region are partially overlapped, exists after the collision detection unit 1d detects the collision. Specifically, the sensor abnormality determination unit 1e determines that the first sensor and the second sensor are normal when the first sensor and the second sensor detect the same situation in the overlapping region after the collision detection unit 1d detects the collision.

FIG. 6 illustrates a situation immediately after the vehicle 10 serving as the own vehicle collided with another vehicle 20 serving as the moving object at the periphery of the vehicle, and abnormality occurs in the sensor by the collision. In the situation illustrated in FIG. 6, the collision detection unit 1d of the ECU 1 first detects the collision of the vehicle 20 and the vehicle 10 based on the change in the relative position of the vehicle 20 and the vehicle 10 indicated by the surrounding environment information, the acceleration and the yaw rate of the vehicle 10 contained in the information indicated by the vehicle momentum, and the like. The coincidence degree recording unit 1b of the ECU 1 carries out a process of calculating and recording the coincidence degree of the surrounding environment information in the overlapping region of the surrounding environment recognition sensor 3 when the collision is detected by the collision detection unit 1d (i.e., timing immediately after the collision). However, in the example of FIG. 6, the abnormality such as the axial shift occurs in the sensor 2 mounted on the vehicle 10 due to the collision with the vehicle 20 thus changing the second region, and hence the first overlapping region in which the first region covered by the sensor 1 and the second region covered by the sensor 2 are partially overlapped no longer exists. Thus, the coincidence degree recording unit 1b records the coincidence degree assuming the coincidence degree is low since the overlapping region does not exist in the calculation of the coincidence degree of the surrounding environment information in the overlapping region of the surrounding environment recognition sensor 3.

Thereafter, the sensor abnormality determination unit 1e of the ECU 1 loads the coincidence degree of the surrounding environment information recorded by the coincidence degree recording unit 1b at the timing immediately before the collision as illustrated in the example of FIG. 4 from the memory of the ECU 1. The sensor abnormality determination unit 1e compares the loaded coincidence degree of the surrounding environment information related to the vehicle 20 at the timing immediately before the collision, and the coincidence degree of the surrounding environment information recorded by the coincidence degree recording unit 1b at the timing immediately after the collision as illustrated in the example of FIG. 6. As a result of the comparison, the sensor abnormality determination unit 1e determines that the abnormality occurred in at least one of the sensor 1 and the sensor 2 before and after the collision when the coincidence degree of the surrounding environment information at the timing immediately before the collision is high as illustrated in the example of FIG. 4, but the coincidence degree of the surrounding environment information at the timing immediately after the collision is low as illustrated in the example of FIG. 6 since both coincidence degrees are not the same extent. This is assumed to be because the abnormality such as the axial shift, and the like occurred in at least one of the sensor 1 and the sensor 2 by the collision, and change occurred by the collision in either the first region covered by the sensor 1 and the second region covered by the sensor 2. Thus, the sensor abnormality determination unit 1e determines that at least one of the first sensor and the second sensor has abnormality under the situation where the first region and the second region do not overlap in the overlapping region after the collision detection unit 1d detects the collision. Specifically, the sensor abnormality determination unit 1e determines that at least one of the first sensor and the second sensor has abnormality when the first sensor and the second sensor do not detect the same situation in the overlapping region after the collision detection unit 1d detects the collision.

The sensor abnormality determination unit 1e may compare the coincidence degree of the surrounding environment information before and after the collision for the second overlapping region in which the first region covered by the sensor 1 and the third region covered by the sensor 3 are partially overlapped. The sensor abnormality determination unit 1e is thus able to determine whether the abnormality occurred in either the sensor 1 or the sensor 2 based on the comparison result of the coincidence degree of the surrounding environment information in the second overlapping region. In the example of FIG. 6, the sensor abnormality determination unit 1e determines that at least one of the first sensor and the second sensor has abnormality under the situation where the first region and the second region do not overlap in the overlapping region, specifically, when the first sensor and the second sensor do not detect the same situation in the overlapping region. At this time point, whether the first sensor has abnormality or the second sensor has abnormality is unknown. The sensor abnormality determination unit 1e determines that the first sensor does not have abnormality and the second sensor has abnormality when the comparison result of the coincidence degree of the surrounding environment information in the second overlapping region is the same extent before and after the collision. When the comparison result of the coincidence degree of the surrounding environment information in the second overlapping region is not the same extent before and after the collision, determination is made that the second sensor does not have abnormality and the first sensor has abnormality, or that both the first sensor and the second sensor have abnormality.

Thus, according to the process of the sensor abnormality determination unit 1e, the sensor abnormality detection device of the present embodiment can determine the sensor abnormality based on the change in a plurality of detection regions, and hence can accurately detect the presence or absence of the sensor abnormality. Furthermore, determination that the detection region is not overlapped can be accurately made and the presence or absence of the sensor abnormality can be detected based on the detection result of the periphery of the vehicle.

Returning back to FIG. 1, the description on the configuration of the sensor abnormality detection device according to the present invention will be continued. In the ECU 1, the position estimating unit 1f is a position estimating means that estimates the position of the object exterior to the vehicle based on the surrounding environment information transmitted from the surrounding environment information acquiring unit 1a. The position estimating unit 1f estimates the position of an obstacle at the periphery of the vehicle 10 based on the detection results of the first sensor and the second sensor, for example. The position estimating unit 1f estimates the position of the obstacle based on the relative position, the relative speed, the relative acceleration, and the like of the obstacle and the vehicle 10 contained in the surrounding environment information. The position estimating unit 1f estimates not only the current position of the obstacle but also the moved position after elapse of a predetermined time as the position of the obstacle.

The avoidance control unit 1g is an avoidance control means that carries out the drive assistance control for controlling the behavior of the vehicle 10 so that the vehicle 10 avoids the obstacle based on the information indicating the vehicle momentum transmitted from the vehicle momentum detection sensor 2, the surrounding environment information transmitted from the surrounding environment information acquiring unit 1a, and the position of the obstacle estimated by the position estimating unit 1f. The avoidance control unit 1g computes the travelling path, the travelling speed, and the like at which the vehicle 10 can avoid the obstacle based on, for example, the vehicle speed and the acceleration of the vehicle 10 contained in the information indicated by the vehicle momentum, various types of information indicating the region in which the vehicle 10 can travel contained in the surrounding environment information, and the position of the obstacle to be avoided. The avoidance control unit 1g outputs the control signal based on the computation process result to the actuator 4, and operates the actuator 4 to execute the avoidance control. The avoidance control unit 1g controls a steering angle of a steering wheel of the vehicle 10 through the actuator 4 such as the EPS, for example, as the avoidance control to execute the steering assistance so that the vehicle 10 avoids the obstacle. The avoidance control unit 1g may combine the brake assistance to the steering assistance and execute the same as the avoidance control to more reliably avoid the obstacle. Thus, the avoidance control unit 1g functions as an avoidance control means for avoiding the movement of the vehicle 10 to the position of the obstacle.

When determined that the collision with the obstacle is avoidable by the collision avoiding determination unit 1c, the collision with the obstacle can be avoided by carrying out the avoidance control described above through the process of the avoidance control unit 1g. However, when determined that the collision with the obstacle is unavoidable by the collision avoiding determination unit 1c, the primary collision may not be avoidable even through the process of the avoidance control unit 1g. In such a case as well, it is desirable in terms of safety to control the vehicle 10 immediately after the primary collision to be moved to a safe place, and minimize the impact by the secondary collision that may occur next. The steering assistance for avoiding the secondary collision can be executed by carrying out the avoidance control even after the primary collision by the avoidance control unit 1g, but in such a case, there is a need to take into consideration that there is a possibility the abnormality occurred in the surrounding environment recognition sensor 3 by the influence of the primary collision. In the present embodiment, in order to assist the avoidance of the secondary collision, the avoidance control unit 1g is caused to execute the following process so as to carry out the steering assistance of the secondary collision avoidance corresponding to the sensor state (normal/abnormal) based on the technique (sensor abnormality determination unit 1e) that enables the abnormality determination of the in-vehicle sensor (surrounding environment recognition sensor 3) for recognizing the surrounding environment.

Specifically, when determined that the surrounding environment recognition sensor 3 has abnormality by the sensor abnormality determination unit 1e after the collision detection unit 1d detects the collision, the avoidance control unit 1g limits the movement of the vehicle 10 in the direction the surrounding environment recognition sensor 3, which is determined as abnormal, is arranged in the vehicle 10, compared to when the surrounding environment recognition sensor 3 is determined as normal. This is the process based on a premise that the use of the surrounding environment information from the surrounding environment recognition sensor 3 in which the abnormality occurred by the influence of the primary collision in the avoidance control is not desirable in terms of safety since the surrounding environment information has low reliability.

For example, the avoidance control unit 1g carries out the secondary collision steering avoidance control by varying the limit on the steering avoidance control target (control lateral G, etc.) according to the sensor state (normal/abnormal) after the collision detection unit 1d detects the collision. In this case, when the control target is set to the detection region of the surrounding environment recognition sensor 3, which is determined as abnormal by the sensor abnormality determination unit 1e, as the steering assistance of the secondary collision avoidance after the primary collision, the avoidance control unit 1g makes the limit on the changing rate of the control target relatively large. When the control target is set to the detection region of the surrounding environment recognition sensor 3, which is determined as normal by the sensor abnormality determination unit 1e, the avoidance control unit 1g makes the limit on the changing rate of the control target relatively small. Thus, the movement of the vehicle 10 to the detection region covered by the surrounding environment recognition sensor 3 determined as normal is facilitated, and the movement of the vehicle 10 to the detection region covered by the surrounding environment recognition sensor 3 determined as abnormal is limited.

The avoidance control unit 1g may carry out the secondary collision steering avoidance control while giving priority to the steering avoiding direction (left, right) according to the sensor state (normal/abnormal) after the collision detection unit 1d detects the collision. In this case, for example, as illustrated in FIG. 7, when determined that the surrounding environment recognition sensor 3 (sensor 2 in FIG. 7) arranged on the front right side of the vehicle 10 has abnormality by the sensor abnormality determination unit 1e, the avoidance control unit 1g sets the priority in the direction of turning the steering wheel higher to the left side than to the right side as the steering assistance of the secondary collision avoidance after the primary collision. Thus, as illustrated in FIG. 7, the vehicle 10 can set the priority of turning the steering wheel to the third region covered by the surrounding environment recognition sensor 3 (sensor 3 in FIG. 7) determined as normal higher than the priority of turning the steering wheel to the second region covered by the surrounding environment recognition sensor 3 (sensor 2 in FIG. 7) determined as abnormal. As a result, the movement of the vehicle 10 to the detection region covered by the surrounding environment recognition sensor 3 (sensor 3 in FIG. 7) determined as normal is facilitated, and the movement of the vehicle 10 to the detection region covered by the surrounding environment recognition sensor 3 (sensor 2 in FIG. 7) determined as abnormal can be limited. Although not illustrated, the avoidance control unit 1g sets the priority in the direction of turning the steering wheel higher to the right side than to the left side as the steering assistance of the secondary collision avoidance after the primary collision when determined that the surrounding environment recognition sensor 3 (sensor 3 in FIG. 7) arranged on the front left side of the vehicle 10 has abnormality by the sensor abnormality determination unit 1e.

Therefore, according to the process of the avoidance control unit 1g, the sensor abnormality detection device of the present embodiment limits the movement in the direction of low reliability of the sensor detection result to suppress the unpredicted collision of the system.

Figure 8:
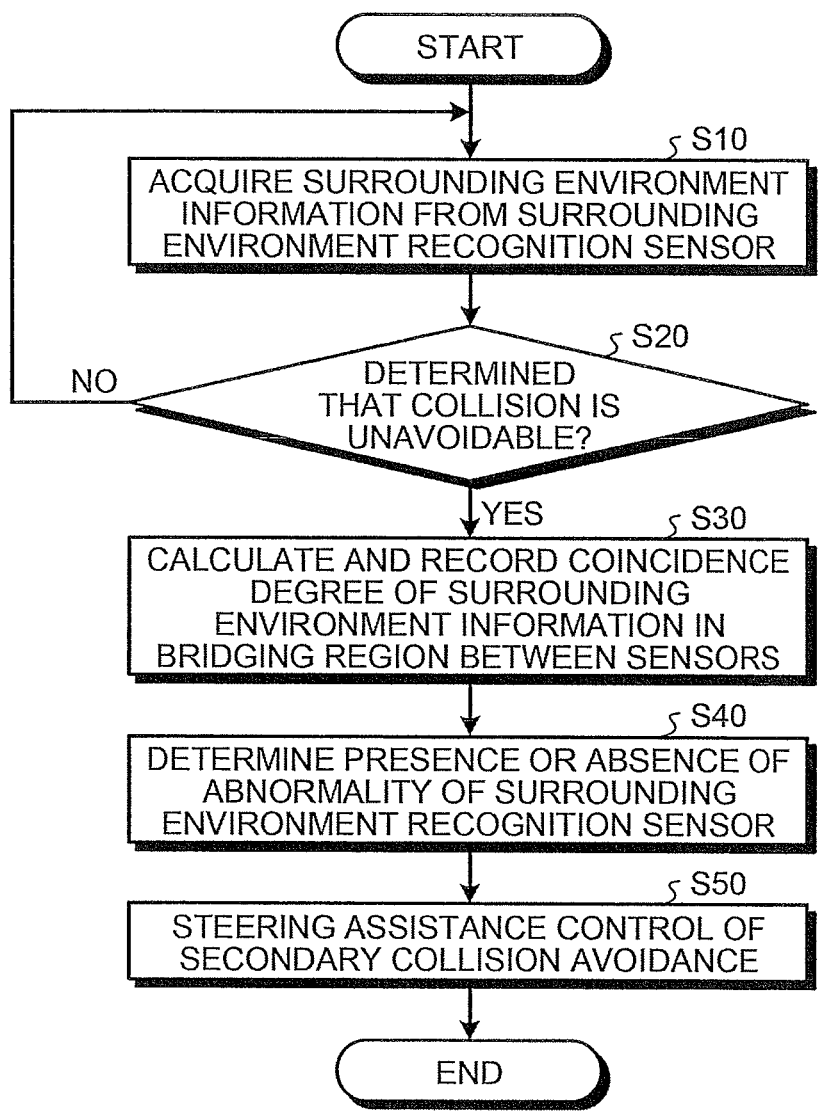
FIG. 8 is a flowchart illustrating one example of a basic process of the sensor abnormality detection device according to the present invention.
Figure 9:
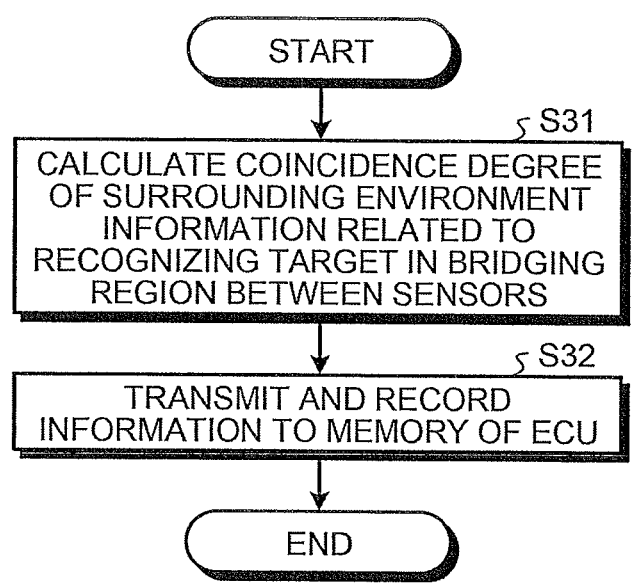
FIG. 9 is a flowchart illustrating one example of a coincidence degree recording process of immediately before the collision.
Figure 10:
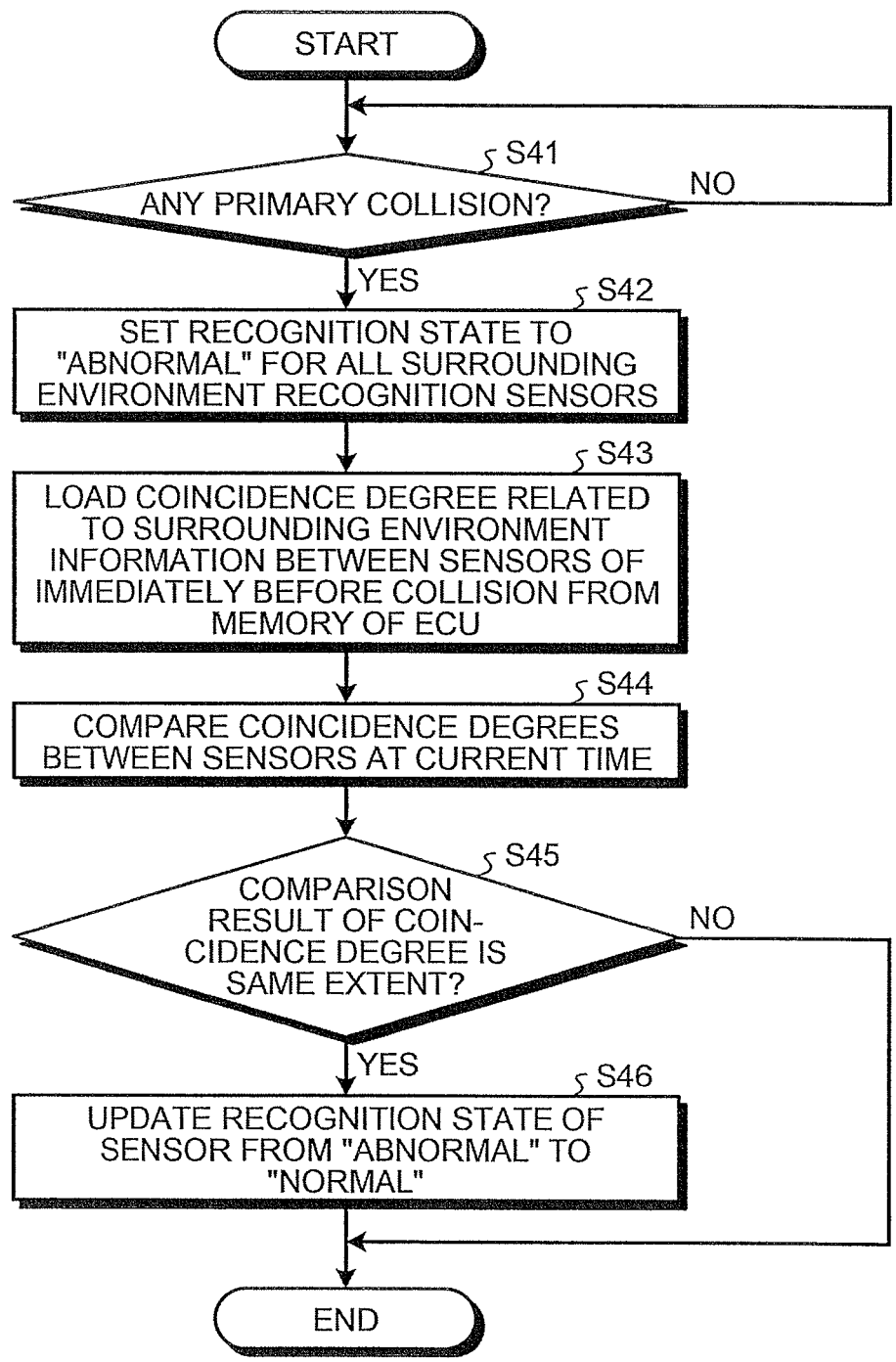
FIG. 10 is a flowchart illustrating one example of a sensor abnormality determination process of immediately after the collision.

Various types of processes executed by the sensor abnormality detection device described above will now be described with reference to FIG. 8 to FIG. 10. FIG. 8 is a flowchart illustrating one example of a basic process of the sensor abnormality detection device according to the present invention. FIG. 9 is a flowchart illustrating one example of a coincidence degree recording process immediately before the collision. FIG. 10 is a flowchart illustrating one example of a sensor abnormality determination process immediately after the collision.

As illustrated in FIG. 8, the surrounding environment information acquiring unit 1a receives and acquires the surrounding environment information indicating the surrounding situation of the vehicle such as the moving object, the stationary obstacle, and the like at the periphery of the vehicle transmitted from the surrounding environment recognition sensor 3 (step S10).

The collision avoiding determination unit 1c determines whether or not the collision of the vehicle 10 and the object exterior to the vehicle is avoidable based on the information indicating the vehicle momentum transmitted from the vehicle momentum detection sensor 2 and the surrounding environment information acquired by the surrounding environment information acquiring unit 1a in step S10 (step S20). In the present embodiment, the collision avoiding determination unit 1c, for example, calculates the time (so-called time-to-collision: TTC) until the collision of the object exterior to the vehicle and the vehicle 10 based on the relative position and the relative speed of the object exterior to the vehicle and the vehicle 10 indicated by the surrounding environment information, and the vehicle speed and the acceleration of the vehicle 10 contained in the information indicated by the vehicle momentum, and the like. The collision avoiding determination unit 1c determines that the collision is avoidable when the calculated TTC is greater than or equal to a predetermined threshold value, and determines that the collision is unavoidable when the calculated TTC is smaller than the predetermined threshold value.

In step S20, the collision avoiding determination unit 1c proceeds to the process of step S30 when determining that the collision is unavoidable (step S20: Yes), and returns to the process of step S10 when determining that the collision is avoidable (step S20: No).

A case in which determination is made that the collision is unavoidable by the collision avoiding determination unit 1c (step S20: Yes) is a case in which determination is made that the time TTC until the collision is smaller than the predetermined threshold value, and thus is the timing immediately before the collision. The coincidence degree recording unit 1b carries out the process of calculating and recording the coincidence degree of the surrounding environment information in the bridging region between the sensors at the timing immediately before the collision, as described above (step S30). The coincidence degree recording process carried out in step S30 of FIG. 8 will be described with reference to FIG. 9.

As illustrated in FIG. 9, the coincidence degree recording unit 1b calculates the coincidence degree of the surrounding environment information including the strength, brightness, color, relative position, and the like associated with the recognizing target (e.g., obstacle determined to be collision unavoidable) in the bridging region between the sensors (step S31). The coincidence degree recording unit 1b calculates the coincidence degree of the surrounding environment information in the overlapping region of the surrounding environment recognition sensor 3 when determined that the collision is unavoidable by the collision avoiding determination unit 1c (i.e., timing immediately before the collision), as illustrated in FIG. 4 described above, for example. The coincidence degree recording unit 1b then transmits and records the coincidence degree calculated in step S31 to the memory of the ECU 1 in correspondence with the calculated time (step S32). Thereafter, the process proceeds to the process of step S40 of FIG. 8.

Returning back to FIG. 8, the sensor abnormality determination unit 1e determines the presence or absence of abnormality of the first sensor that detects the situation of the first region at the periphery of the vehicle 10 and the second sensor that detects the situation of the second region at the periphery of the vehicle 10, the second region being a region different from the first region and overlapping a part of the first region (step S40). The sensor abnormality determination process carried out in step S40 of FIG. 8 will now be described with reference to FIG. 10.

As illustrated in FIG. 10, the sensor abnormality determination process in the present embodiment is the process carried out immediately after the collision, and thus the collision detection unit 1d first detects that the vehicle 10 collided with the object exterior to the vehicle based on the information indicating the vehicle momentum transmitted from the vehicle momentum detection sensor 2 and the surrounding environment information transmitted from the surrounding environment information acquiring unit 1a (step S41). In step S41, the collision detection unit 1d determines whether or not the primary collision of the vehicle 10 and the obstacle is detected.

The process proceeds to the process of next step S42 when the collision detection unit 1d detects the primary collision of the vehicle 10 and the obstacle in step S41 (step S41: Yes), and the process of step S41 is repeated until the primary collision is detected when the collision detection unit 1d does not detect the primary collision of the vehicle 10 and the obstacle (step S41: No).

When the collision detection unit 1d detects the collision in step S41 (step S41: Yes), the sensor abnormality determination unit 1e sets the recognition state to "abnormal" with respect to all the surrounding environment recognition sensors 3 mounted on the vehicle 10 (step S42). When the collision detection unit 1d detects the collision (step S41: Yes), this is the timing immediately after the collision. Thus, in step S42, the coincidence degree recording unit 1b also carries out the process of calculating and recording the coincidence degree of the surrounding environment information in the bridging region between the sensors at the timing immediately after the collision, as described above. Then, the sensor abnormality determination unit 1e loads the coincidence degree of the surrounding environment information recorded by the coincidence degree recording unit 1b at the timing immediately before the collision in step S32 of FIG. 9 from the memory of the ECU 1 (step S43). The sensor abnormality determination unit 1e compares the coincidence degree of the surrounding environment information related to the vehicle 20 at the timing immediately before the collision loaded in step S43, and the coincidence degree of the surrounding environment information recorded by the coincidence degree recording unit 1b at the timing immediately after the collision in step S42 (step S44).

The sensor abnormality determination unit 1e determines whether or not the coincidence degree in the overlapping region between the sensors immediately before the collision and the coincidence degree in the overlapping region between the sensors immediately after the collision are the same extent based on the comparison result by the process of step S44 (step S45). The determination process of step S45 is carried out for every pair of sensors in which the bridging region exists.

The sensor abnormality determination unit 1e updates the recognition state of the corresponding surrounding environment recognition sensor 3 from "abnormal" to "normal" when determined that the comparison result of the coincidence degrees is the same extent in step S45 (step S45: Yes). Thereafter, the process proceeds to the process of step S50 of FIG. 8. When determined that the comparison result of the coincidence degrees is not the same extent in step S45 (step S45: No), the recognition state of the corresponding surrounding environment recognition sensor 3 is not updated to "normal" and is remained "abnormal". Thereafter, the process proceeds to the process of step S50 of FIG. 8.

Returning back to FIG. 8, the avoidance control unit 1g carries out the steering assistance control of the secondary collision avoidance based on the result of the sensor abnormality determination process carried out in step S40 (step S50). Specifically, when determined that the surrounding environment recognition sensor 3 has abnormality by the sensor abnormality determination unit 1e, the avoidance control unit 1g limits the movement of the vehicle 10 in the direction in which the surrounding environment recognition sensor 3, which is determined as abnormal, is arranged in the vehicle 10 compared to when determined that the surrounding environment recognition sensor 3 is normal. The avoidance control process carried out in step S50 of FIG. 8 will be described with reference to FIG. 11.

Figure 11:
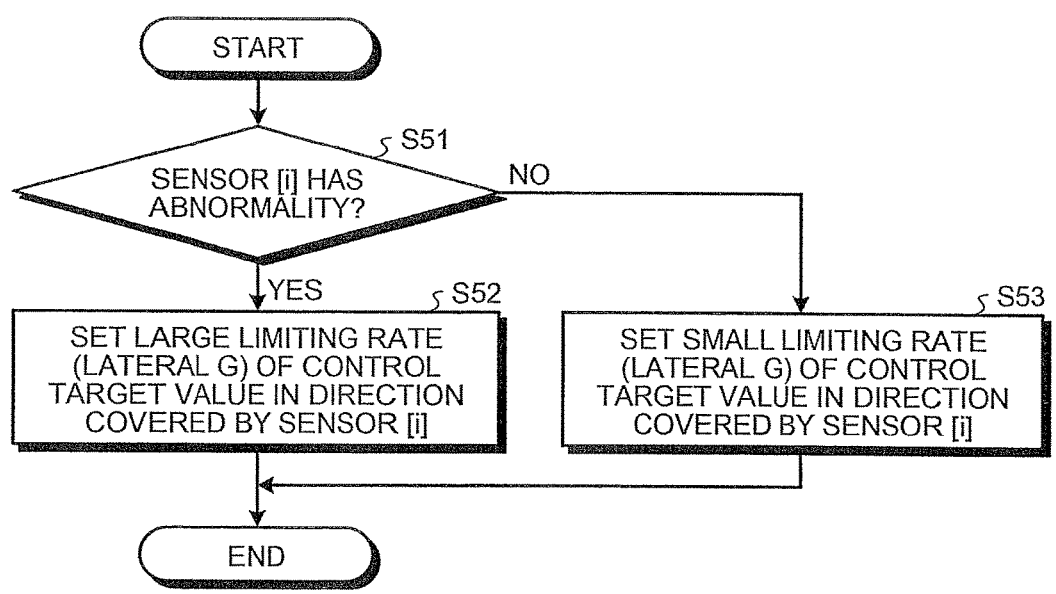
FIG. 11 is a flowchart illustrating one example of a secondary collision avoidance control process.

As illustrated in FIG. 11, the avoidance control unit 1g determines whether or not the recognition state of the sensor [i] of the plurality of surrounding environment recognition sensors 3 mounted on the vehicle 10 is "abnormal" based on the determination result of the sensor abnormality determination unit 1e (step S51).

When determined that the recognition state of the sensor [i] is "abnormal" in step S51 (step S51: Yes), the avoidance control unit 1g sets the limiting rate (lateral G) of the control target value in the direction covered by the sensor [i] large (step S52). That is, in step S52, the avoidance control unit 1g relatively makes the limit with respect to the changing rate of the control target large when the control target is set to the detection region of the surrounding environment recognition sensor 3 determined as abnormal by the sensor abnormality determination unit 1e as the steering assistance of the secondary collision avoidance after the primary collision. Thereafter, the process is terminated.

When determined that the recognition state of the sensor [i] is "normal" in step S51 (step S51: No), the avoidance control unit 1g sets the limiting rate (lateral G) of the control target value in the direction covered by the sensor [i] small (step S53). Thereafter, the process is terminated.

Figure 12:
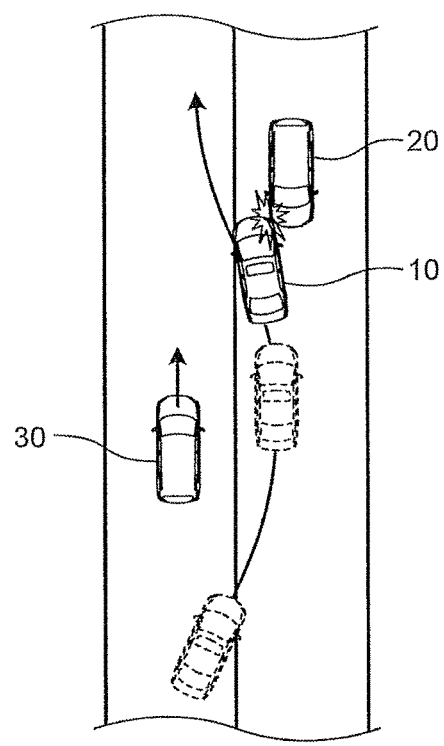
FIG. 12 is a view illustrating one example of a primary collision scene.
Figure 13:
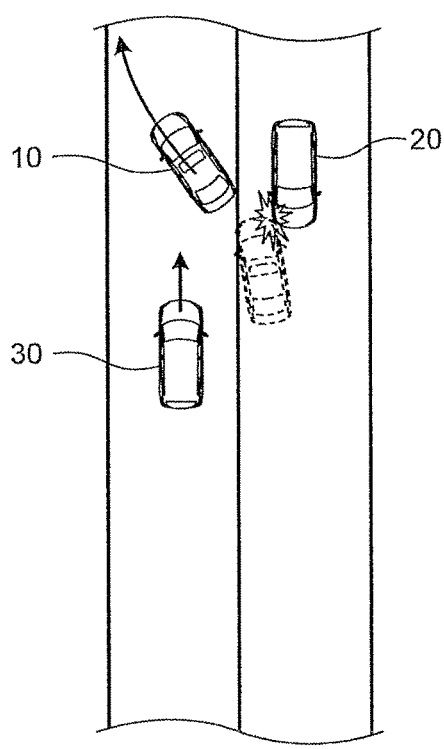
FIG. 13 is a view illustrating one example of a scene of a secondary collision avoidance control.

According to the process of the avoidance control unit 1g illustrated in FIG. 11, the sensor abnormality detection device of the present embodiment can satisfactorily avoid the secondary collision, as illustrated in FIG. 12 and FIG. 13, for example. FIG. 11 is a flowchart illustrating one example of the secondary collision avoidance control process. FIG. 12 is a view illustrating one example of a primary collision scene. FIG. 13 is a view illustrating one example of a scene of the secondary collision avoidance control.

FIG. 12 illustrates a scene in which the vehicle 10 serving as the own vehicle overtakes another preceding vehicle 30 on the same travelling lane, and primarily collides with another vehicle 20 travelling on the oncoming lane. In FIG. 12, assumption is made that abnormality occurred in the surrounding environment recognition sensor 3 (e.g., sensor 2) mounted on the front right side by the collision at the front right side with the vehicle 20 when the vehicle 10 overtook the vehicle 30. Even in such situation, the recognition state of the surrounding environment recognition sensor 3 (e.g., sensor 3 and sensor 1) mounted at the front left side and the middle at the front can be determined as normal by the process of the sensor abnormality determination unit 1e in the present embodiment. Thus, according to the process of the avoidance control unit 1g, the secondary collision with the following vehicle 30 can be avoided by performing the steering control so that the vehicle 10 shifts to outside the road on the left side, as illustrated in FIG. 13. FIG. 13 illustrates a scene of the secondary collision avoidance control of shifting the vehicle 10 to outside the road through the steering assistance of turning the steering wheel to the left after the screen of the primary collision illustrated in FIG. 12.

In the embodiment described above, an example in which the coincidence degree recording unit 1b calculates and records the coincidence degree of the surrounding environment information in the overlapping region of the surrounding environment recognition sensor 3 at the timing immediately before the collision (i.e., timing at which determination is made that the collision is unavoidable by the collision avoiding determination unit 1c) or the timing immediately after the collision (i.e., timing at which the collision is detected by the collision detection unit 1d) has been described, but the coincidence degree recording unit 1b may calculate and record the coincidence degree of the surrounding environment information in the overlapping region of the surrounding environment recognition sensor 3 at a predetermined timing (e.g., at the time of engine start or at the time of turning ON the steering assistance switch) before the collision. The sensor abnormality determination unit 1e thus can check whether the sensor mounted on the vehicle 10 has abnormality before carrying out the process of comparing the coincidence degrees of the overlapping region between the sensors immediately before the collision and immediately after the collision.

REFERENCE SIGNS LIST

1 ECU (sensor abnormality detection device)
1a surrounding environment information acquiring unit
1b coincidence degree recording unit
1c collision avoiding determination unit
1d collision detection unit
1e sensor abnormality determination unit
1f position estimating unit
1g avoidance control unit
2 vehicle momentum detection sensor
2a acceleration sensor
2b yaw rate sensor
2c vehicle speed sensor
3 surrounding environment recognition sensor
3a sensor 1 (first sensor)
3b sensor 2 (second sensor)
3c sensor 3 (third sensor)
4 actuator

The invention claimed is:

1. A sensor abnormality detection device comprising:
a first sensor configured to detect a situation of a first region at a periphery of an own vehicle;
a second sensor configured to detect a situation of a second region at the periphery of the own vehicle, the second region being a region different from the first region and including an overlapping region that overlaps a part of the first region;
a sensor abnormality determination means configured to determine presence or absence of abnormality of the first sensor and the second sensor; and
a collision detection means configured to detect collision of the own vehicle to an object exterior to the vehicle; wherein
the sensor abnormality determination means determines that at least one of the first sensor and the second sensor has abnormality, at the time the first region and the second region do not overlap in the overlapping region, after the collision detection means detects the collision.

2. The sensor abnormality detection device according to claim 1, wherein the sensor abnormality determination means determines at least one of the first sensor and the second sensor has abnormality, at the time the first sensor and the second sensor do not detect the same situation in the overlapping region, after the collision detection means detects the collision.

3. The sensor abnormality detection device according to claim 1, further comprising:

a position estimating means configured to estimate a position of an obstacle at the periphery of the own vehicle based on detection results of the first sensor and the second sensor; and
an avoidance control means configured to avoid movement of the own vehicle to a position of the obstacle; wherein
at the time determined by the sensor abnormality determination means that the sensor has abnormality after the collision detection means detects the collision, the avoidance control means limits the movement of the own vehicle to a direction where the sensor determined to be abnormal is arranged in the own vehicle compared to at the time determined that the sensor is normal.

4. The sensor abnormality detection device according to claim 2, further comprising:
a position estimating means configured to estimate a position of an obstacle at the periphery of the own vehicle based on detection results of the first sensor and the second sensor; and
an avoidance control means configured to avoid movement of the own vehicle to a position of the obstacle wherein
at the time determined by the sensor abnormality determination means that the sensor has abnormality after the collision detection means detects the collision, the avoidance control means limits the movement of the own vehicle to a direction where the sensor determined to be abnormal is arranged in the own vehicle compared to at the time determined that the sensor is normal.

5. A sensor abnormality detection device comprising:
a first sensor configured to detect a situation of a first region at a periphery of an own vehicle;
a second sensor configured to detect a situation of a second region at the periphery of the own vehicle, the second region being a region different from the first region and including a first overlapping region that overlaps a part of the first region;
a third sensor configured to detect a situation of a third region at the periphery of the own vehicle, the third region being a region different from the first region and the second region and including a second overlapping region that overlaps a part of the first region;
a sensor abnormality determination means configured to determine presence or absence of abnormality of the first sensor, the second sensor, and the third sensor; and
a collision detection means configured to detect collision of the own vehicle to an object exterior to the vehicle; wherein
at the time determining that at least one of the first sensor and the second sensor has abnormality at the time the first sensor and the second sensor do not detect the same situation in the first overlapping region after the collision detection means detects the collision, the sensor abnormality determination means further determines whether or not the first sensor and the third sensor detect the same situation in the second overlapping region, and
at the time the first sensor and the third sensor detect the same situation in the second overlapping region, the sensor abnormality determination means determines that the first sensor does not have abnormality and the second sensor has abnormality.

6. A sensor abnormality detection device comprising:
a first sensor configured to detect a situation of a first region at a periphery of an own vehicle;
a second sensor configured to detect a situation of a second region at the periphery of the own vehicle, the second region being a region different from the first region and including an overlapping region that overlaps a part of the first region;
an electronic control unit (ECU) programmed to:
  determine presence or absence of abnormality of the first sensor and the second sensor; and
  detect collision of the own vehicle to an object exterior to the vehicle; wherein
  the ECU determines at least one of the first sensor and the second sensor has abnormality, at the time the first region and the second region do not overlap in the overlapping region, after the collision is detected.

* * * * *